(12) United States Patent  (10) Patent No.: US 7,556,759 B2
Hiemstra et al. (45) Date of Patent: Jul. 7, 2009

(54) AUTO-INDEXING VISOR CORE

(76) Inventors: David L. Hiemstra, 3956 Glenview Ct., Hudsonville, MI (US) 49426; Michael L. Lanser, 617 Midway, Holland, MI (US) 49423; Steven J. Gager, 16275 Riley Ave., Holland, MI (US) 49424

( * ) Notice: Subject to any disclaimer, the term of this patent is extended or adjusted under 35 U.S.C. 154(b) by 821 days.

(21) Appl. No.: 11/044,146

(22) Filed: Jan. 27, 2005

(65) Prior Publication Data

US 2005/0167886 A1 Aug. 4, 2005

Related U.S. Application Data

(60) Provisional application No. 60/539,953, filed on Jan. 29, 2004.

(51) Int. Cl.
 *B29C 45/00* (2006.01)
(52) U.S. Cl. .................................. 264/297.1; 264/297.2
(58) Field of Classification Search .............. 264/297.1, 264/320, 280, 285, 286, 287, 242, 250, 248, 264/249, 241, 255, 259, 260, 261, 263, 266, 264/297.2, 295, 296, 339, 157, 243
See application file for complete search history.

(56) References Cited

U.S. PATENT DOCUMENTS

| 1,963,393 | A |   | 6/1934  | Woodall |
|-----------|---|---|---------|---------|
| 2,279,648 | A |   | 4/1942  | Westrope |
| 2,340,015 | A |   | 1/1944  | Felcher et al. |
| 3,242,245 | A | * | 3/1966  | Cunningham et al. ....... 264/545 |
| 3,610,680 | A |   | 10/1971 | Brady |
| 3,827,748 | A |   | 8/1974  | Herr et al. |
| 4,417,761 | A |   | 11/1983 | Cziptschirsch et al. |
| 4,458,938 | A |   | 7/1984  | Viertel et al. |
| 4,469,367 | A |   | 9/1984  | Kuttler et al. |
| 4,763,946 | A |   | 8/1988  | Robbins et al. |
| 4,810,023 | A |   | 3/1989  | Kawada |
| 4,867,500 | A |   | 9/1989  | Oosterbaan et al. |
| 4,890,875 | A |   | 1/1990  | Takahashi |
| 4,922,987 | A | * | 5/1990  | Marontate et al. ........... 160/183 |
| 4,925,233 | A |   | 5/1990  | Clark |
| 4,952,008 | A |   | 8/1990  | Lobanoff et al. |
| 4,988,140 | A |   | 1/1991  | Van Order |
| 5,004,289 | A |   | 4/1991  | Lanser et al. |
| 5,044,687 | A |   | 9/1991  | Abu-Shumays et al. |
| 5,066,061 | A |   | 11/1991 | Miller |
| 5,131,711 | A |   | 7/1992  | Laferle |
| 5,221,120 | A |   | 6/1993  | Viertel et al. |
| 5,251,949 | A |   | 10/1993 | Miller et al. |
| 5,308,136 | A |   | 5/1994  | Schwarz et al. |

(Continued)

FOREIGN PATENT DOCUMENTS

JP 5286362 11/1993

*Primary Examiner*—Philip C Tucker
*Assistant Examiner*—Xue Liu
(74) *Attorney, Agent, or Firm*—Price, Heneveld, Cooper, DeWitt & Litton, LLP

(57) ABSTRACT

A method for making visor cores is disclosed. The method includes sequentially molding visor cores, and interconnecting the visor cores as they are molded to form a chain of visor cores. The visor cores remain oriented relative to one another, and the visor cores can be sequentially positioned in a cooling fixture and a flexing fixture. The chain of visors can be wound on a spool or the like for transport.

25 Claims, 7 Drawing Sheets

U.S. PATENT DOCUMENTS

| | | | |
|---|---|---|---|
| 5,308,137 A | 5/1994 | Viertel et al. | |
| 5,318,336 A | 6/1994 | Aymerich et al. | |
| 5,328,227 A | 7/1994 | Pax, Jr. et al. | |
| 5,338,082 A | 8/1994 | Miller | |
| 5,338,083 A | 8/1994 | Gute | |
| 5,409,285 A | 4/1995 | Snyder et al. | |
| 5,411,309 A | 5/1995 | Aymerich et al. | |
| 5,486,391 A * | 1/1996 | Tyner | 428/44 |
| 5,538,310 A | 7/1996 | Frankhouse et al. | |
| 5,616,053 A | 4/1997 | Bogursky et al. | |
| 5,653,490 A | 8/1997 | Fink et al. | |
| 5,725,392 A | 3/1998 | Bianca et al. | |
| 5,765,899 A | 6/1998 | Watjer et al. | |
| 5,779,298 A | 7/1998 | Smelser et al. | |
| 5,810,421 A | 9/1998 | Kalkman et al. | |
| 5,860,690 A | 1/1999 | Dellinger et al. | |
| 5,887,933 A | 3/1999 | Peterson | |
| 5,967,587 A | 10/1999 | Collet et al. | |
| 5,967,588 A | 10/1999 | Collet et al. | |
| 5,967,841 A | 10/1999 | Bianca et al. | |
| 6,010,174 A | 1/2000 | Murdock et al. | |
| H1834 H | 2/2000 | Wilson et al. | |
| 6,042,172 A | 3/2000 | Murdock | |
| 6,174,019 B1 | 1/2001 | Collet et al. | |
| 6,192,966 B1 | 2/2001 | Yang | |
| 6,231,105 B1 | 5/2001 | Viertel | |
| 6,254,168 B1 | 7/2001 | Crotty, III | |
| 6,286,887 B1 | 9/2001 | Hashmi | |
| 6,289,968 B1 | 9/2001 | Karten et al. | |
| 6,402,221 B1 | 6/2002 | Ogunjobi | |
| 6,436,517 B1 | 8/2002 | Zahn | |
| 6,692,059 B1 | 2/2004 | Mills | |
| 2002/0195843 A1* | 12/2002 | Glasl | 296/214 |
| 2003/0094250 A1* | 5/2003 | Huang | 160/370.23 |

\* cited by examiner

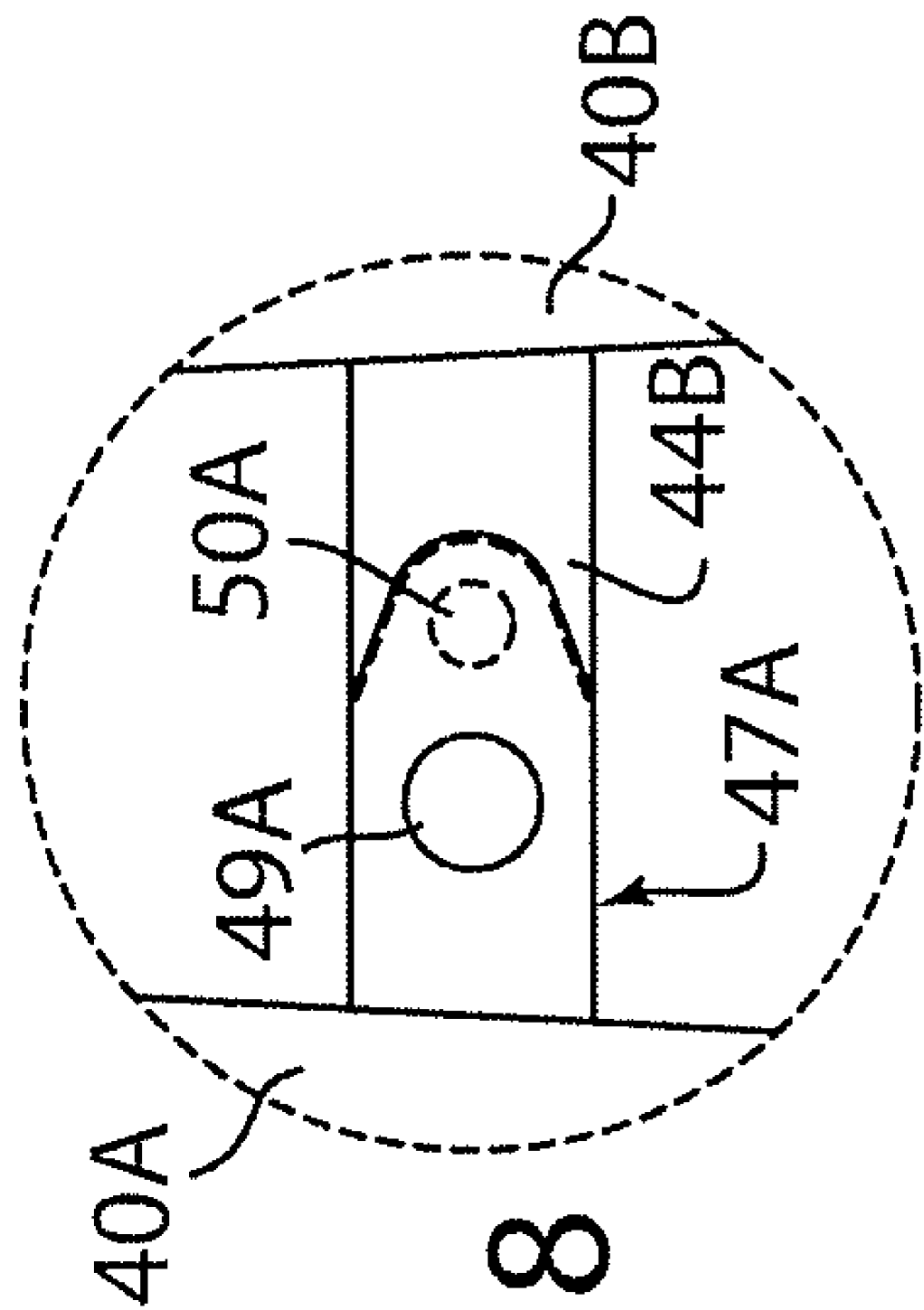

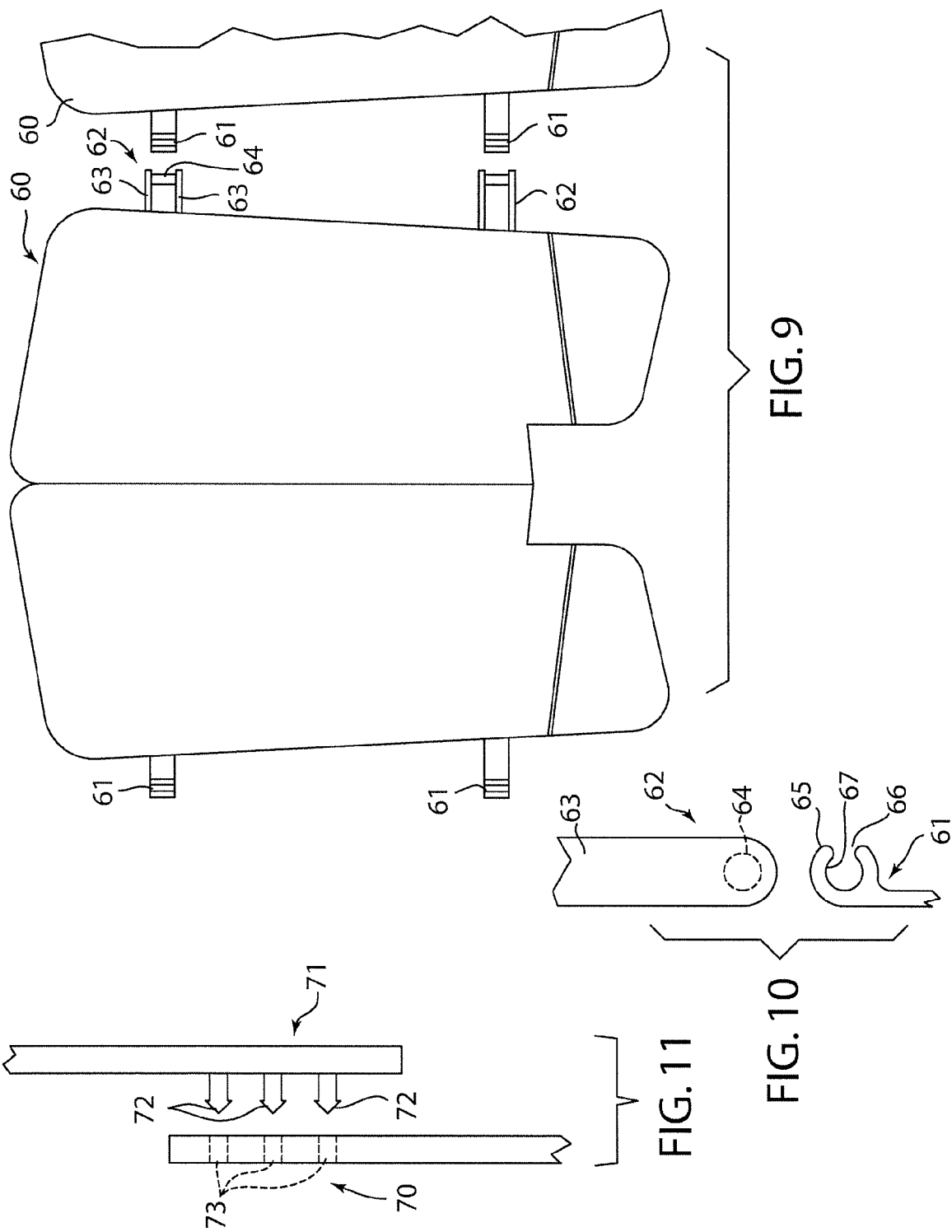

AUTO-INDEXING VISOR CORE

CROSS-REFERENCE TO RELATED APPLICATIONS

This application claims the benefit of U.S. Provisional Application No. 60/539,953, filed on Jan. 29, 2004, entitled AUTO-INDEXING VISOR CORE, the entire contents of which are incorporated by reference.

BACKGROUND OF THE INVENTION

Sun visors for vehicles such as automobiles, trucks, and the like may include a plastic core. Such plastic cores are made in a "butterfly" configuration including two halves that are interconnected by a living hinge. During fabrication, the two halves of the core are folded about the living hinge, and the various internal components of the visor are positioned within the cavity formed by the visor core. The outside of the visor may be covered with a suitable fabric or the like, and may also include a layer of foam padding or the like. The visor cores are molded and individually moved to the subsequent processing stations. This may require manual reorientation of the visor cores by a worker. Also, the assembled visor cores may be shipped or otherwise transported to a remote location for the final fabrication. The individual visor cores may be placed in a box or other container for shipping with this visor cores in a random orientation and/or position. Thus, the individual visor core assemblies must be reoriented manually once they have reached the remote location. Also, known molding methods may leave the visor core in the mold for cooling. Such cooling adds to the cycle time, thereby limiting the rate at which the visor cores can be molded.

SUMMARY OF THE INVENTION

One aspect of the present invention is a method for forming visor cores, including sequentially molding a plurality of visor cores. Each of the visor cores have first and second halves interconnected by a living hinge. The visor cores are sequentially interconnected to form a chain of visor cores. The visor cores are sequentially folded about the living hinge.

Another aspect of the present invention is a method for fabricating visor cores including molding a first visor core having a first connector defining a first configuration adjacent a first side of the first visor core. The first visor has a second connector defining a second configuration adjacent a second side of the first visor core. The method includes molding a second visor core that is substantially identical to the first visor core. The first visor core is connected to the second visor core by engaging the second connectors of the first visor core with the first connectors of the second visor core.

Yet another aspect of the present invention is a method for forming visor cores including sequentially molding and interconnecting a plurality of visor cores to form a chain of equally spaced, interconnected visor cores. Each visor core includes a living hinge. The method includes flexing each living hinge in a flexing fixture.

These and other features, advantages, and objects of the present invention will be further understood and appreciated by those skilled in the art by reference to the following specification, claims, and appended drawings.

BRIEF DESCRIPTION OF THE DRAWINGS

FIG. 8 is an enlarged view illustrating the interconnection between the visors of FIG. 7;

FIG. 9 is a partially fragmentary, exploded view of a visor according to another aspect of the present invention;

FIG. 10 is a fragmentary view illustrating the connectors of the visors of FIG. 9; and FIG. 11 is a fragmentary view of another connector for interconnecting visor cores according to another aspect of the present invention.

DETAILED DESCRIPTION OF PREFERRED EMBODIMENT

Figure 1:
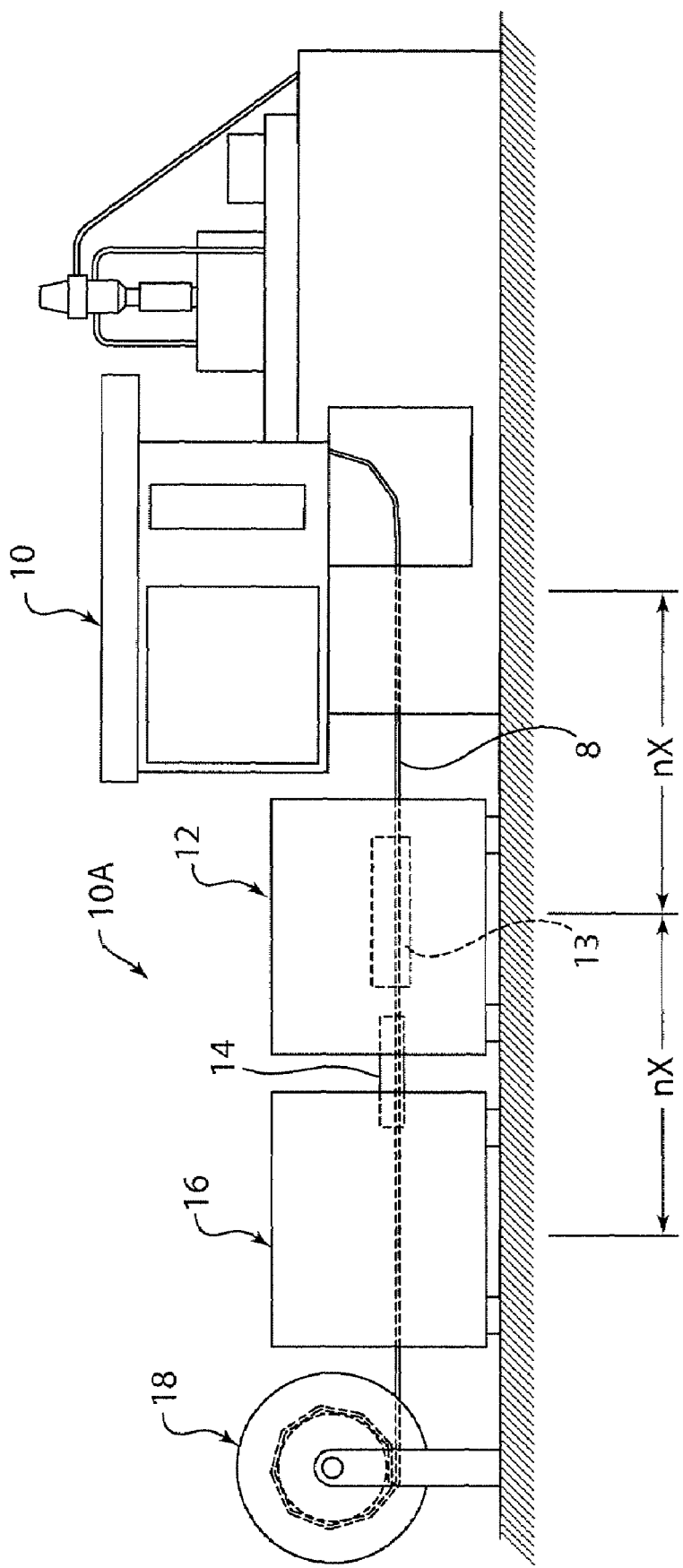
FIG. 1 is a partially schematic view of a molding machine, cooling fixture, and flexing fixture according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a molding machine 10 that may be used to mold visor cores according to the present invention. As described in more detail, the visor cores are interconnected to form a chain 8 of interconnected visor cores. After the visor cores are molded, the visor cores are shifted to a cooling fixture 12. The cooling fixture 12 includes a support 13 that maintains the shape of the visor cores during cooling. A feeder 14 transports the visor cores from the cooling fixture 12 to a flexing fixture 16 that flexes the visor cores about the living hinge of the visor cores to ensure that the living hinge remains flexible. The chain 8 of visor cores is then wound onto a spool 18 or the like for transport (if required) to a remote location for further assembly.

Figure 2:
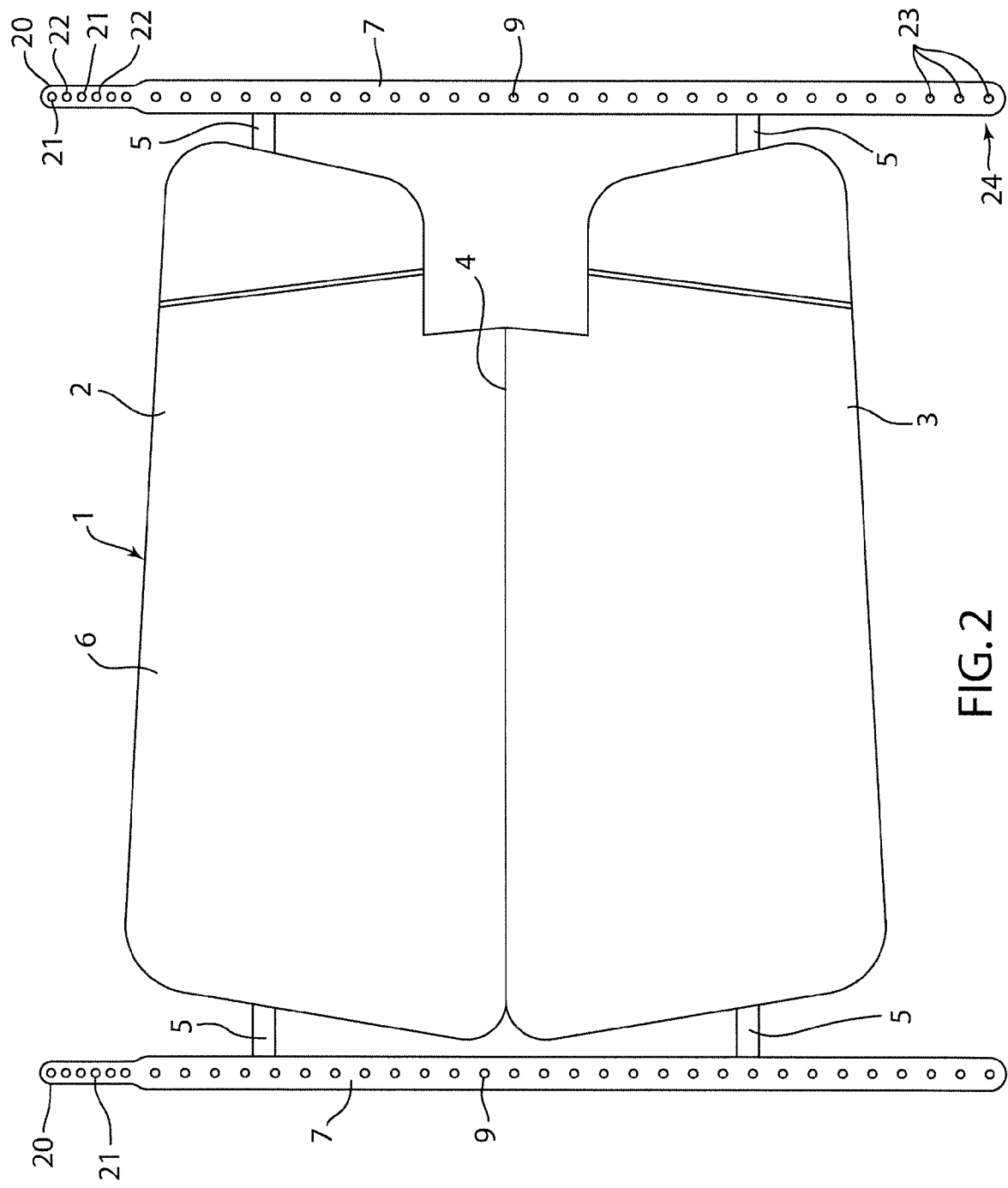
FIG. 2 is a view of a visor core according to one aspect of the present invention.
Figures 3, 4:
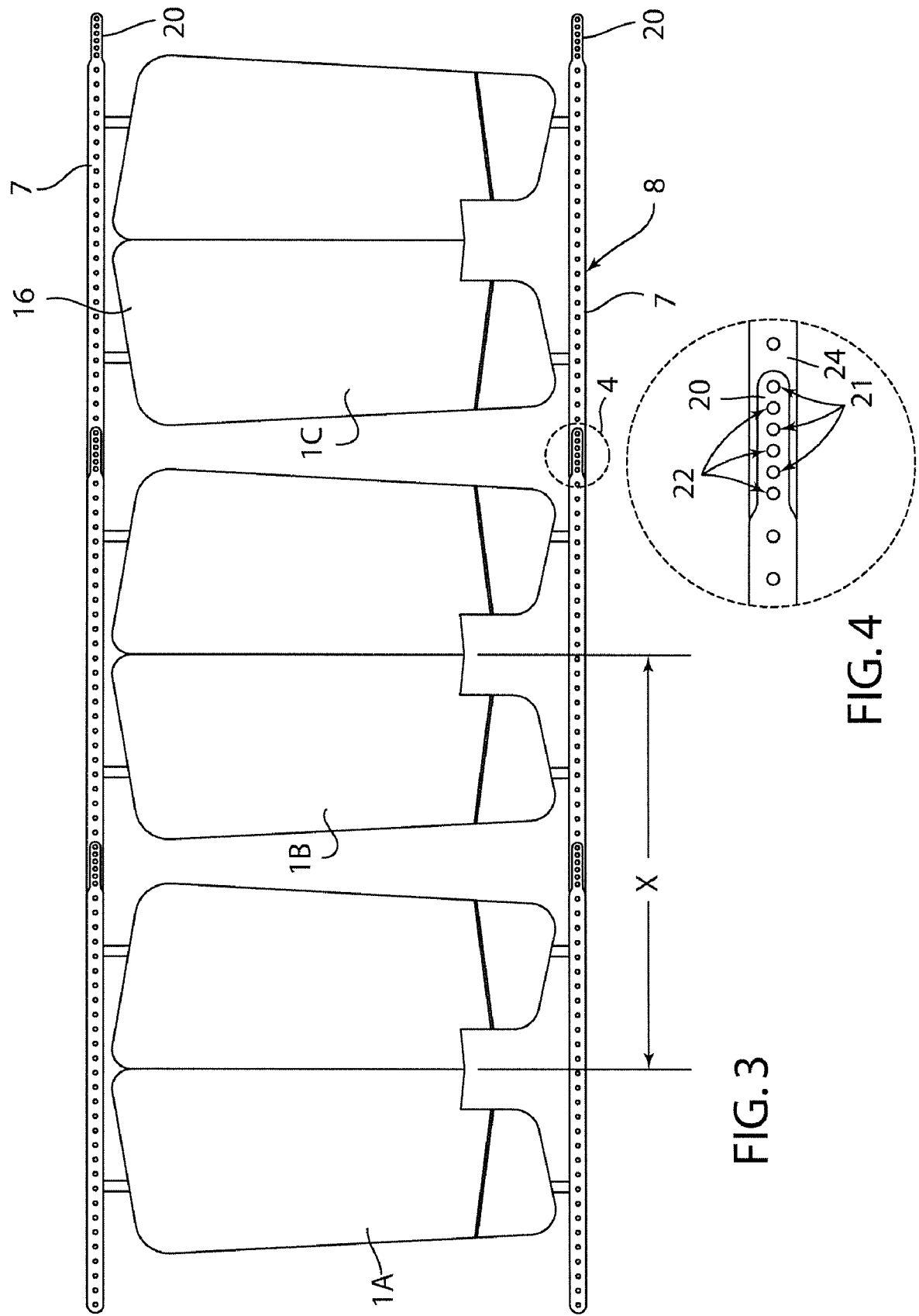
FIG. 3 is a view of a plurality of interconnected visor cores.
FIG. 4 is an enlarged view of a portion of the visor cores of FIG. 3.

With reference to FIG. 2, a visor core 1 includes first and second halves 2 and 3 that are interconnected along a living hinge 4. The first and second halves 2 and 3, respectively, have a shallow concave configuration that forms an internal cavity when the first and second halves 2, 3 are folded together along the living hinge 4. The first and second halves 2 and 3 thereby form an internal cavity in which the various internal components (not shown) of the visor core are located. A plurality of extensions 5 are integrally molded with the main body 6 of the visor core 1, and interconnect the main body 6 to a pair of longitudinal strips 7. The strips 7 are generally flat and thin, and include a plurality of openings 9 that may be utilized to locate and/or transport the visor core 1 for subsequent steps in the fabrication process. After the visor core 1 is molded, the mold shifts to the opened position, and the visor core is shifted out of the mold into the cooling fixture 12. The next visor core is then molded in the molding machine 10. As each visor core 1 is molded, it is simultaneously molded/connected to the immediately prior visor core 1 that has just been removed from the molding machine 10. A chain of visor cores (FIG. 3) is thereby formed. In FIG. 3, the first visor core molded is designated 1A, the second visor core molded is designated 1B, and the third visor core molded is designated 1C. As the molding process is repeated, additional visor cores are connected to the chain 8 until the desired number of visor cores 1 have been produced for a given run.

With further reference to FIG. 4, a first end 20 of each longitudinal strip 7 includes a plurality of openings 21 that are positioned within the mold as the next visor core is molded, such that the openings 21 are filled with molten plastic material to thereby integrally mold together the adjacent strips 7 and visor cores 1A, 1B, 1C, etc. Openings 22 in ends 20 are aligned with the three holes 23 adjacent the second end 24 of longitudinal strips 7. Openings 22 and 23 are not filled during the molding process to provide openings that can be utilized to ensure location of adjacent visor cores 1.

Figure 5:
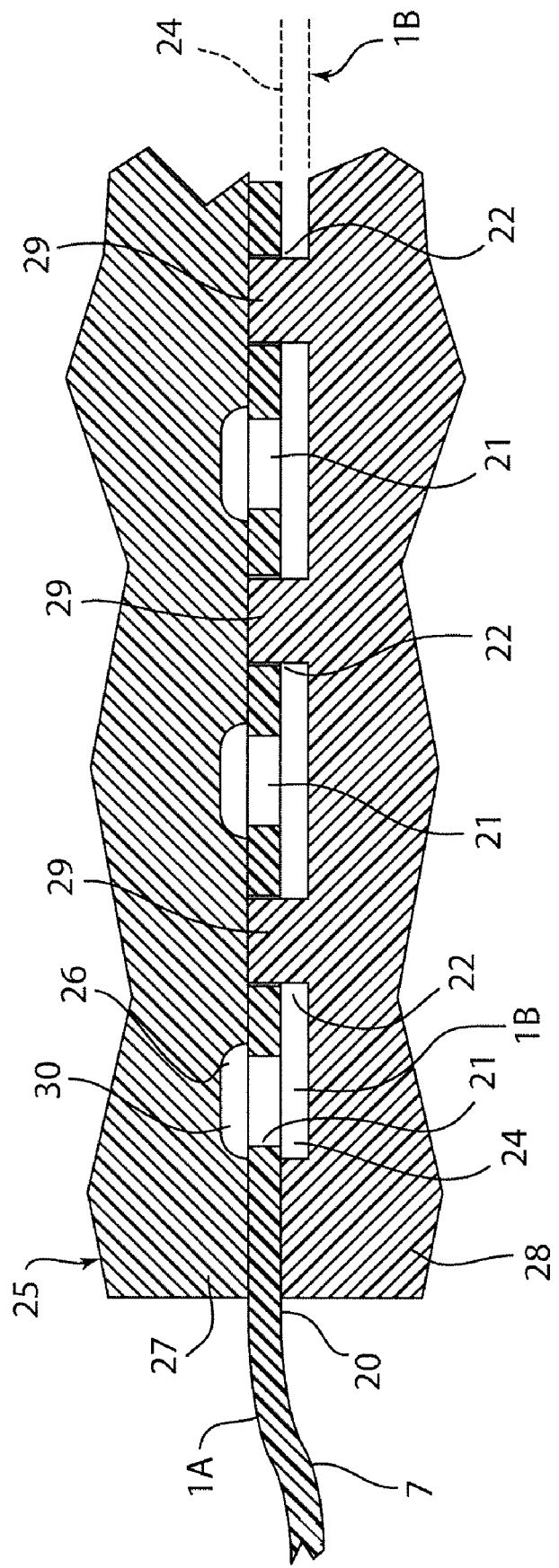
FIG. 5 is a fragmentary, cross-sectional view illustrating the connecting portions of FIG. 4 in a mold.

As illustrated in FIG. 5, after visor core 1A is molded, it is shifted most of the way out of a mold 25. However, the end portions 20 are positioned in a mold cavity formed between first and second mold halves 27 and 28. Pins 29 extend through openings 22 to locate the visor 1A and to form openings 22 extending through the strips 7 after the adjacent visor cores are molded together. During the molding process, molten plastic material flows into the cavity 26 through openings 21 to form a head 30 and securely mold together the end 24 of visor 1B to the end 20 of visor 1A as visor core 1B is molded. In this way, the spacing between adjacent visor cores 1A, 1B, 1C, etc. can be closely controlled. Because the distance X (FIG. 3) between each adjacent visor core in the chain 8 is closely controlled, the distance between each station in the fabrication line 9 (FIG. 1) can be positioned at a distance nX, wherein n designates an integer. Thus, as a third visor core 1C is being molded in the machine 10, a second visor 1B may be positioned in the cooling fixture 12, and a first visor core 1A can simultaneously be positioned in a flexing fixture 16. Also, it will be readily apparent that some visors may be positioned in the feeder 14 while other visors are simultaneously positioned in the cooling fixture 12 and flexing fixture 16.

Figure 7:
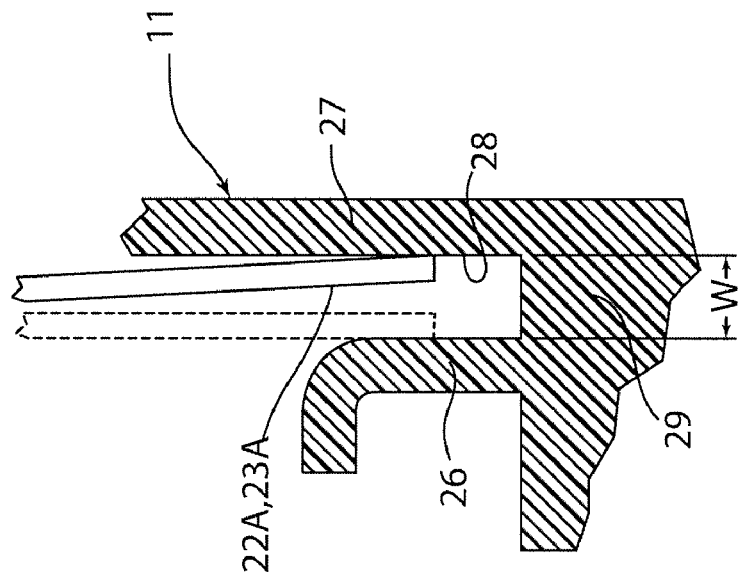
FIG. 7 illustrates a pair of the visors of FIG. 6 that are interconnected.
Figure 6:
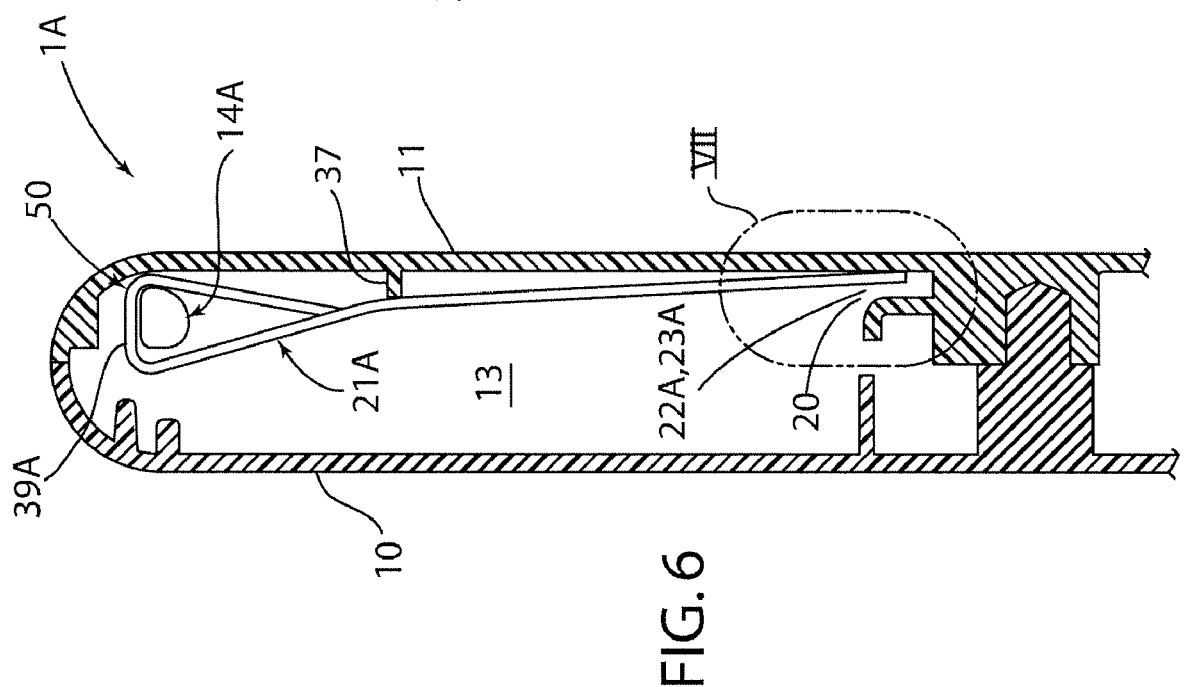
FIG. 6 is a visor according to another aspect of the present invention.

With further reference to FIG. 6, a visor core 40 according to another aspect of the present invention may include first and second halves 41 and 42 interconnected by a living hinge 43. Visor core 40 includes extensions 44 and 45, each of which includes a thicker portion 46. Extensions 47 and 48 extend from an opposite side of the visor core 40, and include larger openings 49 and smaller openings 50 therethrough. During fabrication, extensions 47 and 48 remain in the mold, and extensions 44 and 45 are molded around the extensions 47 and 48, respectively, in a manner similar to the method discussed above in connection with FIGS. 2-5. With reference to FIGS. 7 and 8 adjacent first and second visor cores 40A and 40B are molded together during fabrication. Visor cores 40A and 40B are substantially identical to visor core 40, and corresponding features of visor cores 40A and 40B are designated utilizing the same part numbers as for visor core 40, except that the suffixes "A" and "B", respectively, are included in the part number designations. An opening 50A in a visor core 40A remains in the mold, and is filled by molten plastic material to thereby interconnect with an extension 44B of a second visor core 40B. Openings 49A remain open via pins or the like in the mold, and are utilized to position the visor core 40A in the mold as visor core 40B is being molded. Also, openings 49A may be utilized to position the visor cores 40A, 40B, etc. as they move along a fabrication line 10A in substantially the same manner as described above.

With reference to FIGS. 9 and 10, a visor core 60 according to another aspect of the present invention may be molded with clasps 61 forming first connectors that can be interconnected with the connectors 62 of an adjacent visor core. Connectors 62 include a pair of spaced apart wall portions 63, with a pin 64 or the like extending between the wall portions 63. The clasps 61 include a C-shaped end 65 defining an opening 66, and having a generally cylindrical inner surface 67. After a visor core 60 is molded, it is shifted out of the mold. The next visor core 60 is then mechanically interconnected to the visor core 60 that was previously molded by snapping clasps 61 around pins 64. The connectors 61 and 62 permit rotation of adjacent visor cores 60, to facilitate movement along the fabrication line 910A, and for winding around a spool 18.

With further reference to FIG. 11, connectors 70 and 71 may also be utilized to interconnect adjacent visor cores. Barbed extensions 72 can be pushed through openings 73 to thereby interconnect adjacent visor cores.

The arrangement described above provides for lower cycle times during fabrication of visor cores because the visor cores can be pulled out of the mold 10 and positioned in the cooling fixture 12, without relying on gravity to cause the visor core to fall out as in prior molding arrangements. Furthermore, the subsequent fabrication processes involving the visor cores can be performed by machines that transfer the visor cores from one station to another, without requiring an operator to individually transport and align the visor cores for each step of the assembly process. Because the visor cores remain positioned relative to one another as they are wound on the spool 18 or the like, the orientation of the visors relative to one another is maintained during shipping. Thus, subsequent assembly operations can be automated, without requiring a worker to manually remove the visor cores from a shipping container and position them within a fixture or the like for the next steps in the fabrication process. Because the visor cores remain oriented and positioned relative to one another, the transfer between stations in the fabrication process can be accomplished by machine, and the need to have an individual manually move and reorient the visor core in the next fixture or machine is eliminated.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A method for forming visor cores, comprising:
sequentially molding a plurality of visor cores, each visor core having first and second halves interconnected by a living hinge;
sequentially interconnecting the visor cores to form a chain of the visor cores;
sequentially folding the visor cores about the living hinge.

2. The method of claim 1, including:
sequentially molding the visor cores together.

3. The method of claim 2, wherein:
each visor core has a connector with an opening; and including:
filling the opening to mold adjacent visor cores together.

4. The method of claim 3, wherein:
each visor core has an extension; and including:
overlapping the extension and opening of the connector of adjacent visor cores before the visor cores are molded together.

5. The method of claim 4, wherein:
each visor core includes at least two connectors with openings and at least two extensions.

6. The method of claim 1, wherein:
each visor core includes first and second connectors, and including:
mechanically interconnecting the second connectors of each visor core with the first connectors of the next visor core in the chain.

7. The method of claim 6, including:
deforming at least a selected one of the first and second connectors as the first and second connectors are mechanically interconnected.

8. The method of claim 7, wherein:
the first connectors have a C-shaped portion, and the second connectors include a generally cylindrical portion that is received in the C-shaped portion of the first connectors.

9. The method of claim 7, wherein:
the first connectors have an opening, and the second connectors include a barbed extension that is received in the openings of the first connectors.

10. A method for fabricating visor cores, comprising:
providing a mold tool having a mold cavity;
molding a first visor core in the mold cavity, wherein the first visor core includes first and second halves that are interconnected by a living hinge disposed between the first and second halves, the first visor core having a first connector defining a first configuration adjacent a first side of the first visor core, the first visor core having a second connector defining a second configuration adjacent a second side of the first visor core;
moving the first visor core out of the mold cavity;
molding a second visor core in the mold cavity after molding the first visor core in the mold cavity, wherein the second visor core is substantially identical to the first visor core;
connecting the first visor core to the second visor core by engaging the second connector of the first visor core with the first connector of the second visor core.

11. The method of claim 10, wherein:
the second connector of the first visor core and the first connector of the second visor core are molded together as the second visor core is molded to connect the first visor core to the second visor core.

12. The method of claim 11, wherein:
the second connectors comprise extensions having an opening therethrough; and
the first and second connectors overlap and the opening is filled when the first and second connectors are molded together.

13. The method of claim 11, wherein:
the first connector of the second visor core is molded to the second connector of the first visor core simultaneously with the molding of the second visor core.

14. The method of claim 10, wherein:
the first connectors comprise clasps having a C-shaped portion;
the second connectors include a cylindrical portion and including:
snapping the cylindrical portions of the second connectors into the C-shaped portions of the first connectors.

15. The method of claim 10, including:
deforming at least a selected one of the first and second connectors when the first visor core is connected to the second visor core.

16. A method for forming visor cores including at least a first visor core, comprising:
sequentially molding a plurality of additional visor cores that are substantially identical to the first visor core; and
sequentially interconnecting the visor cores to form a chain of visor cores at equally spaced intervals along the chain;
supporting and cooling each visor core in a cooling fixture after molding of the visor core;
wherein the molding and interconnecting comprises:
molding a first visor core having a first connector defining a first configuration adjacent a first side of the first visor core, the first visor having a second connector defining a second configuration adjacent a second side of the first visor core;
molding a second visor core that is substantially identical to the first visor core; and
connecting the first visor core to the second visor core by engaging the second connectors of the first visor core with the first connectors of the second visor core.

17. The method of claim 16, including:
forming each visor core with a living hinge; and
flexing each visor core about the living hinge after cooling the visor cores.

18. The method of claim 17, including:
forming a locating feature associated with each visor core; and
using the locating feature for positioning the visor cores in the cooling fixture.

19. The method of claim 18, wherein:
the locating features comprise an opening; and including:
inserting a pin in the openings to position the visor cores.

20. A method for forming visor cores, comprising:
sequentially molding and interconnecting a plurality of visor cores to form a chain of equally spaced, interconnected visor cores, each visor core including first and second halves and a living hinge interconnecting the first and second halves; and
flexing each living hinge in a flexing fixture.

21. The method of claim 20, including:
supporting and cooling the visor cores in a cooling fixture.

22. The method of claim 20, wherein:
the visor cores are sequentially molded together.

23. The method of claim 20, wherein:
the visor cores are mechanically interconnected.

24. The method of claim 20, including:
winding the chain of visor cores on a spool.

25. The method of claim 20, including:
forming a positioning feature associated with each visor core;
utilizing the positioning feature to position the visor cores.

* * * * *

UNITED STATES PATENT AND TRADEMARK OFFICE
CERTIFICATE OF CORRECTION

PATENT NO. : 7,556,759 B2  
APPLICATION NO. : 11/044146  
DATED : July 7, 2009  
INVENTOR(S) : David L. Hiemstra, Michael L. Lanser and Steven J. Gager Page 1 of 1

It is certified that error appears in the above-identified patent and that said Letters Patent is hereby corrected as shown below:

Claim 1, Col. 4, line 55;
Insert --and-- after --visor cores;--

Claim 10, Col. 5, line 38;
Insert --and-- after --visor core;--

Claim 25, Col. 6, line 57;
Insert --and-- after --core;--

Signed and Sealed this
Eighteenth Day of October, 2011

David J. Kappos
*Director of the United States Patent and Trademark Office*